(12) United States Patent
Lee et al.

(10) Patent No.: US 10,009,884 B2
(45) Date of Patent: *Jun. 26, 2018

(54) METHOD OF ERROR RECOVERY IN TRANSMITTING AND RECEIVING VOICE SERVICE IN PACKET BASED MOBILE COMMUNICATION SYSTEMS

(71) Applicant: Electronics and Telecommunications Research Institute, Daejeon (KR)

(72) Inventors: Kyoung Seok Lee, Daejeon (KR); Jae Heung Kim, Daejeon (KR); Soo Jung Jung, Daejeon (KR); Jae Young Ahn, Daejeon (KR)

(73) Assignee: Electronics and Telecommunications Research Institute, Daejeon-si (KR)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/049,330

(22) Filed: Feb. 22, 2016

(65) Prior Publication Data

US 2016/0242154 A1 Aug. 18, 2016

Related U.S. Application Data

(63) Continuation of application No. 12/996,927, filed as application No. PCT/KR2009/003254 on Jun. 17, 2009, now Pat. No. 9,271,263.

(30) Foreign Application Priority Data

Jun. 20, 2008 (KR) .................. 10-2008-0058425
Jun. 15, 2009 (KR) .................. 10-2009-0052760

(51) Int. Cl.
*H04W 72/04* (2009.01)
*H04W 72/12* (2009.01)

(52) U.S. Cl.
CPC ......... *H04W 72/042* (2013.01); *H04W 72/04* (2013.01); *H04W 72/0413* (2013.01); *H04W 72/1289* (2013.01)

(58) Field of Classification Search
None
See application file for complete search history.

(56) References Cited

U.S. PATENT DOCUMENTS 7,912,057 B2 * 3/2011 Petry .................... H04L 65/601
370/390
8,031,688 B2 10/2011 Papasakellariou et al.
(Continued)

FOREIGN PATENT DOCUMENTS

KR 10-2007-0103649 A1 10/2007

OTHER PUBLICATIONS

Kalyanasundaram, Suresh et al., "Resource Allocation Scheme for 802.16," IEEE 802.16 Broadband Wireless Access Working Group, http://ieee802.org/16, 3 pages, (2007).
Notice of Allowance dated Oct. 15, 2015 in related U.S. Appl. No. 12/996,927.
Office Action dated Apr. 10, 2015 in related U.S. Appl. No. 12/996,927.

(Continued)

*Primary Examiner* — Candal Elpenord

(57) ABSTRACT

Provided is a method of transmitting and receiving data using a persistent allocation scheme in order to effectively support a voice service between a base station and a mobile terminal in a packet based mobile communication system. When an error occurs in transmitting control information that indicates whether to use a radio resource using the persistent allocation scheme, the base station may retransmit the control information and thereby maintain a communication quality.

30 Claims, 5 Drawing Sheets

(56) References Cited

U.S. PATENT DOCUMENTS

| | | |
|---|---|---|
| 8,102,820 B2 | 1/2012 | Kwon et al. |
| 8,155,067 B2 | 4/2012 | Wang et al. |
| 2008/0192674 A1 | 8/2008 | Wang et al. |
| 2009/0010240 A1 | 1/2009 | Papasakellariou et al. |
| 2009/0168731 A1 | 7/2009 | Zhang et al. |
| 2009/0287976 A1 | 11/2009 | Wang et al. |
| 2009/0298524 A1 | 12/2009 | Kuo |
| 2009/0307555 A1 | 12/2009 | Cai et al. |
| 2010/0058135 A1* | 3/2010 | Tseng .................... H04L 1/1887 714/748 |
| 2011/0124360 A1 | 5/2011 | Sagfors et al. |
| 2011/0194502 A1 | 8/2011 | Sung et al. |

OTHER PUBLICATIONS

Advisory Action dated Feb. 4, 2015 in related U.S. Appl. No. 12/996,927.
Office Action dated Oct. 10, 2014 in related U.S. Appl. No. 12/996,927.
Office Action dated May 8, 2014 in related U.S. Appl. No. 12/996,927.
Advisory Action dated Dec. 3, 2013 in related U.S. Appl. No. 12/996,927.
Office Action dated Aug. 23, 2013 in related U.S. Appl. No. 12/996,927.
Office Action dated Feb. 12, 2013 in related U.S. Appl. No. 12/996,927.

\* cited by examiner

[Fig. 4]
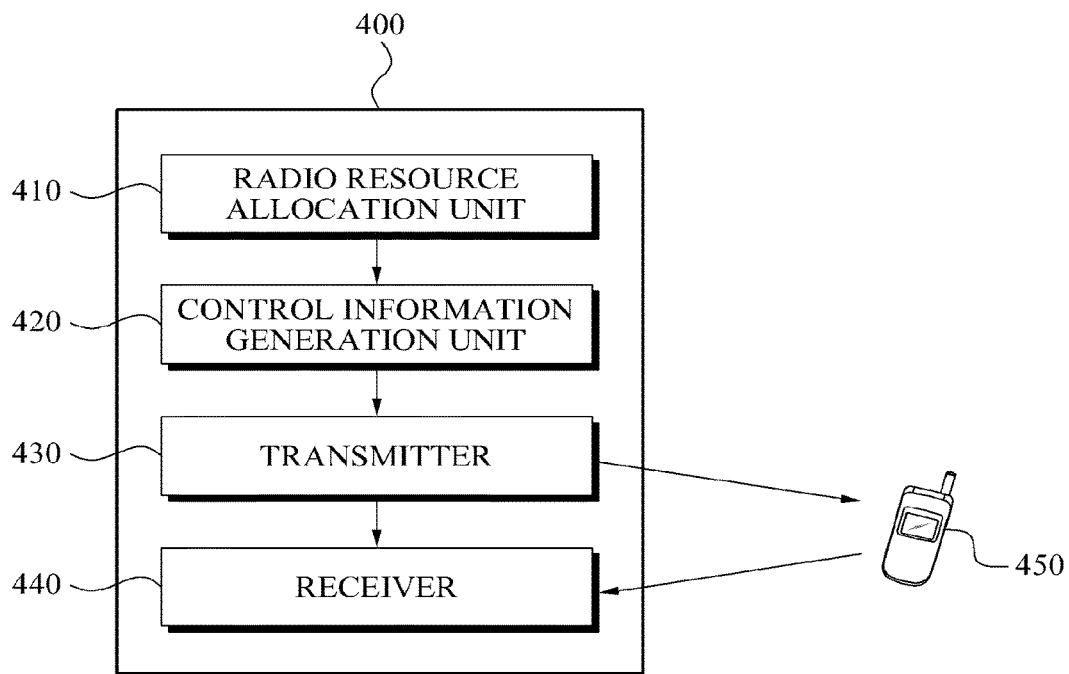
[Fig. 5]
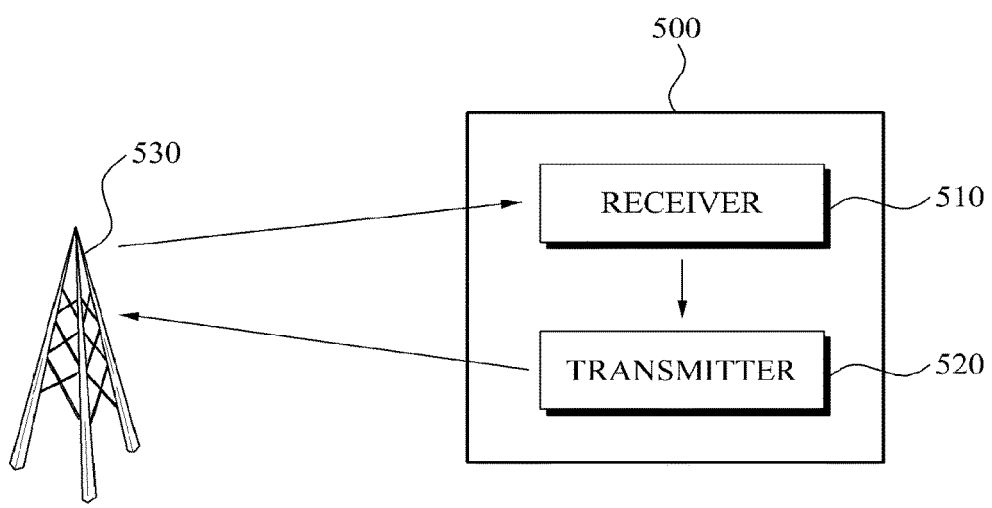

[Fig. 6]
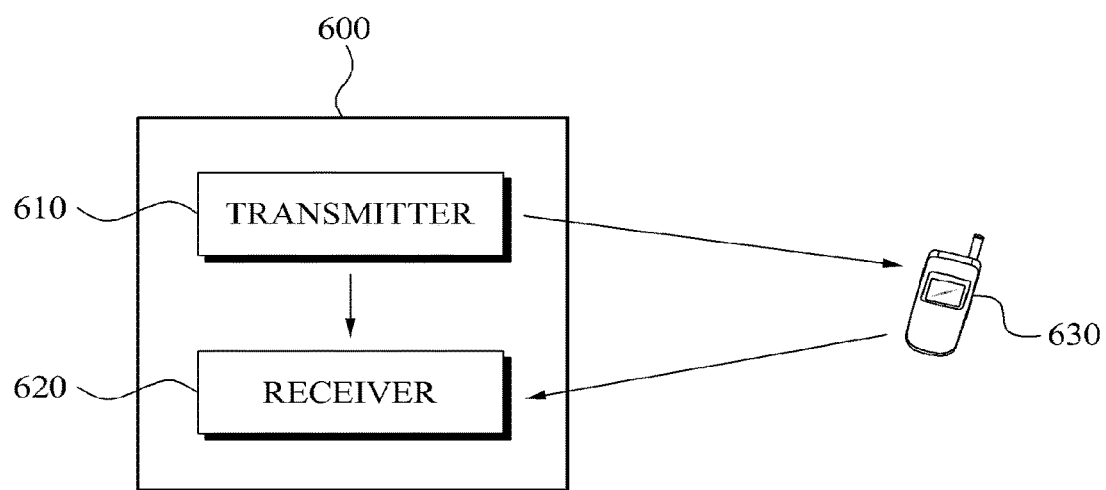

METHOD OF ERROR RECOVERY IN TRANSMITTING AND RECEIVING VOICE SERVICE IN PACKET BASED MOBILE COMMUNICATION SYSTEMS

CROSS REFERENCE TO RELATED APPLICATIONS

This application is a continuation of U.S. patent application Ser. No. 12/996,927, filed Dec. 8, 2010, which claims the benefit under 35 U.S.C. §371, of International Application No. PCT/KR09/03254, filed Jun. 17, 2009, which claimed priority to Korean Application No. 10-2009-0052760, filed Jun. 15, 2009, and Korean Application No. 10-2008-0058425, filed Jun. 20, 2008, in the Korean Intellectual Property Office, all of the disclosures of which are hereby incorporated by reference.

BACKGROUND (1) Field

The present invention relates to a method of transmitting and receiving data in a packet based mobile communication system, and more particularly, to a method of recovering from a reception error of a control message, which occurs when transmitting and receiving data using a persistent allocation scheme, in order to effectively support a voice service between a base station and a mobile terminal in a next generation packet mobile communication system, which is under discussion for a standardization.

(2) Discussion of the Background

3rd Generation Partnership Project (3GPP), one of a number of mobile communication standardization organizations, is engaging in a Long Term Evolution (LTE) standardization process and an advanced LTE standardization process in order to develop a packet based mobile communication system standardization. A mobile communication system generally includes a base station constituting a cell, and a mobile terminal used by a user. A plurality of mobile terminals may transmit and receive packet data to and from the base station via a radio channel.

SUMMARY

An aspect of the present invention provides a method of effectively controlling an activation and a deactivation of a persistent allocation scheme when transmitting and receiving packet data using the persistent allocation scheme, and a method of transmitting and receiving a control message for an error recovery.

According to an aspect of the present invention, there is provided a base station including: a radio resource allocation unit to allocate a radio resource to a terminal; a control information generation unit to generate control information based on the allocated radio resource; a transmitter to transmit the control information to the terminal; and a receiver to receive an acknowledgement (ACK) message with respect to the control information.

According to another aspect of the present invention, there is provided a terminal including: a receiver to receive, from a base station, control information associated with data; and a transmitter to transmit, to the base station, an ACK message with respect to the control information. The receiver may receive the data based on the control information.

According to still another aspect of the present invention, there is provided a base station including: a transmitter to transmit, to a terminal, control information associated with first data, and to transmit the first data to the terminal using the control information; and a receiver to receive an ACK message with respect to the control information. When the ACK message with respect to the control information is not received, the transmitter may retransmit the control information.

According to embodiments of the present invention, when an error occurs wherein the error is an activation message not received by a terminal transmitted from a base station in a persistent allocation scheme, it is possible to quickly recover from the error.

BRIEF DESCRIPTION OF DRAWINGS

FIG. 4 is a block diagram illustrating a structure of a base station according to an embodiment of the present invention;

FIG. 5 is a block diagram illustrating a structure of a terminal according to an embodiment of the present invention; and FIG. 6 is a block diagram illustrating a structure of a base station according to another embodiment of the present invention.

DETAILED DESCRIPTION

Figure 1:
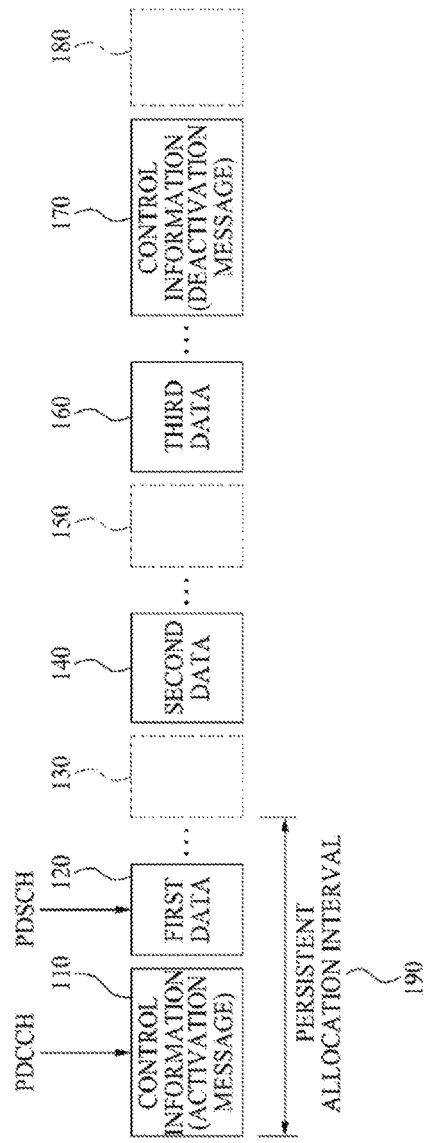
FIG. 1 is a diagram illustrating an example of recovering from a transmission error according to an embodiment of the present invention.

Reference will now be made in detail to exemplary embodiments of the present invention, examples of which are illustrated in the accompanying drawings, wherein like reference numerals refer to the like elements throughout. Exemplary embodiments are described below to explain the present invention by referring to the figures.

FIG. 1 is a diagram illustrating an example of recovering from a transmission error according to an embodiment of the present invention. Although FIG. 1 shows an embodiment where a base station transmits downlink data to a terminal, the present invention may be applicable to an embodiment where the terminal transmits uplink data to the base station.

Generally, an amount of the downlink data may be too great to be transmitted from the base station to the terminal at once. Therefore, the base station may divide the downlink data into a plurality of data blocks, and sequentially transmit the divided data blocks to the terminal. Hereinafter, the divided data blocks are referred to as first data, second data, and the like, respectively.

Referring to FIG. 1, the base station may transmit first data 120 to the terminal. The base station may transmit control information 110 associated with the first data 120 prior to transmitting the first data 120. According to an embodiment of the present invention, the control information 110 may include information associated with a radio resource used to transmit the first data 120. The terminal may receive information associated with the radio resource, and receive the first data 120 by referring to the received information associated with the radio resource. For example, the terminal may be aware of information associated with a time domain or a frequency domain where the first data 120 is transmitted, by referring to information associated with the radio resource. The terminal may receive the first data 120 in the time domain or the frequency domain where the first data 120 is transmitted.

The control information 110 may include modulation and coding scheme information associated with the first data 120 or error control scheme information associated with the first data 120. The terminal may receive the modulation and coding scheme information or the error control scheme information, and receive the first data 120 using the modulation and coding scheme information or the error control scheme information.

When the present invention is applied to a 3rd Generation Partnership Project (3GPP) Long Term Evolution (LTE) system, control information may be transmitted using a Physical Downlink Control Channel (PDCCH). Also, first data or second data may be transmitted using a Physical Downlink Shared Channel (PDSCH).

Referring again to FIG. 1, the base station may transmit data every persistent allocation interval 190. After transmitting the first data 120, the base station may transmit second data 140 to the terminal. When control information 130 associated with the second data 140 is different from the control information 110 associated with the first data 120, the base station may transmit the control information 130 associated with the second data 140 to the terminal.

The terminal may receive information associated with a radio resource to transmit the second data 140, and modulation and coding scheme information or error control scheme information associated with the second data 140, which are included in the control information 130. The terminal may receive the second data 140 using the control information 130.

A case where the control information 110 associated with the first data 120 is different from the control information 130 associated with the second data 140 is referred to as a variable allocation scheme. The variable allocation scheme may need to transmit control information with respect to every piece of data.

In the case of a service with a low data transmission rate such as a voice service, when control information is additionally transmitted with respect to every piece of data, it may be ineffective. The base station may apply the same modulation and coding scheme or the same error control scheme to every piece of data. In this case, the control information 110 associated with the first data 120 may be the same as the control information 130 associated with the second data 140. Accordingly, only when initially transmitting data, the base station may transmit the control information 110. After transmitting the control information 110, the base station may not transmit additional control information. Since a transmission of control information decreases, a radio resource utilization efficiency may be enhanced, which is referred to as a persistent allocation scheme or a semi-persistent scheduling scheme.

In the case of the persistent allocation scheme, an activation message included in the control information 110 may be transmitted prior to data transmission. The activation message indicates a start of use of the radio resource. Also, a deactivation message included in control information 170 may be transmitted after the data transmission. The deactivation message indicates a suspension of use of the radio resource.

Since a status of a radio channel formed between the base station and the terminal may be unstable, the terminal may not receive control information. When the terminal does not receive the control information, the terminal may not receive first data and second data.

Referring to FIG. 1, in the variable allocation scheme, the control information 110, 130, and 150 may be transmitted with respect to the first data 120, the second data 140, and third data 160, respectively. Therefore, when the terminal does not receive the control information 110 associated with the first data 120, the terminal may abandon receiving of the first data 120. When the terminal receives the control information 130 associated with the second data 140, the terminal may receive the second data 140 using the control information 130.

In the persistent allocation scheme, the control information 110 and 130 may be transmitted at particular points in time. When the terminal does not receive the control information 110 and 130, the terminal may not receive the first data 120 and the second data 140.

According to an embodiment of the present invention, when a terminal receives a control information, the terminal may transmit, to a base station, an acknowledgement (ACK) message with respect to the control information. When the base station receives, from the terminal, the ACK message with respect to the control information, it may be known that the base station successfully receives the control information.

Conversely, when the base station does not receive the ACK message with respect to the control information, whether the terminal successfully receives the control information may be uncertain. In preparation for a case where the terminal does not receive the control information, the base station may retransmit the control information to the terminal.

Figure 2:
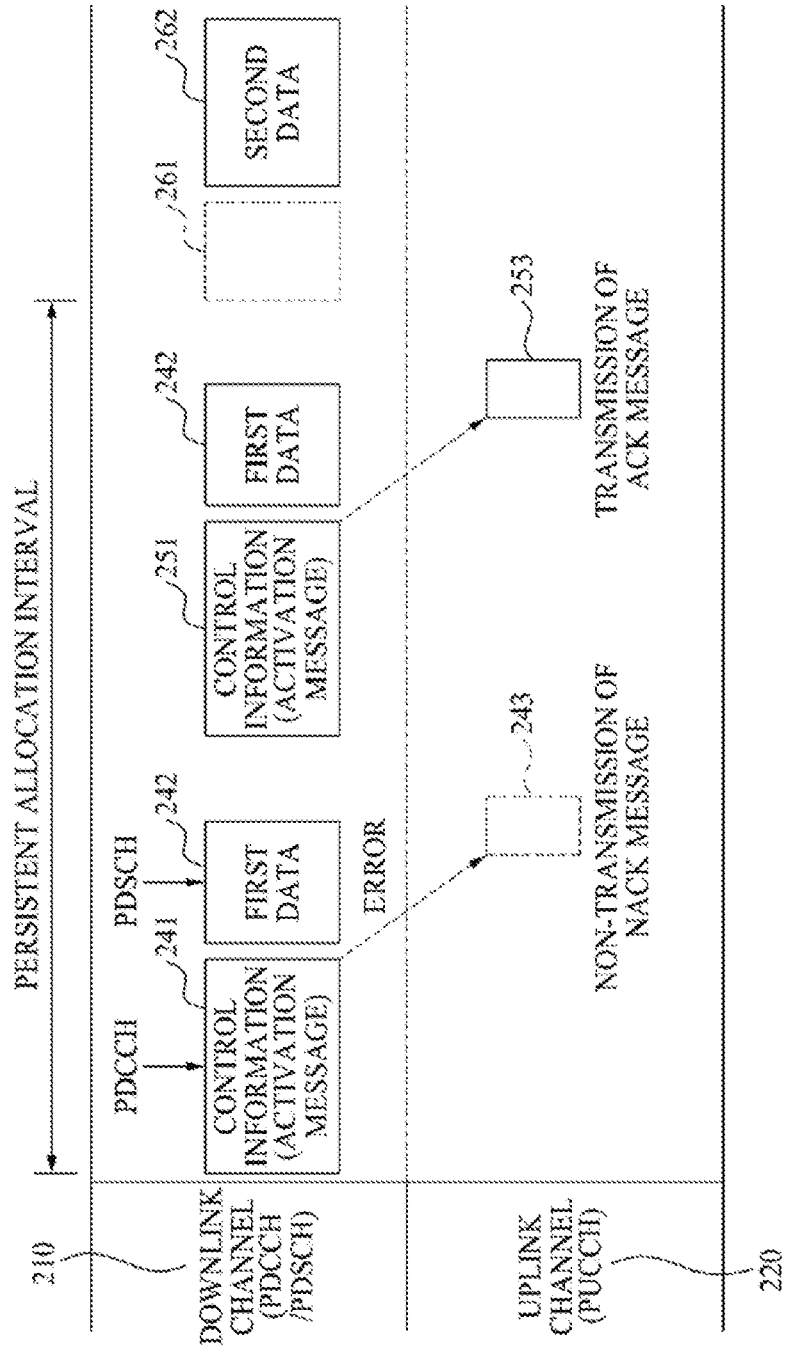
FIG. 2 is a diagram illustrating an operation of a base station recovering from a transmission error according to an embodiment of the present invention.

FIG. 2 is a diagram illustrating an operation of a base station recovering from a transmission error according to an embodiment of the present invention. The base station may transmit first data 242 and 252, second data 262, and control information 241, 251, and 261 using a downlink channel 210.

The control information 241 may include an activation message with respect to a radio resource. The terminal may receive the first data 242 using the radio resource. The transmission error may be defined as the control information 241 or the first data 242 transmitted from the base station is not received by the terminal.

When the transmission error occurs, the terminal may not recognize that the radio resource is activated. Also, since the terminal may be unaware of that the control information 241 or the first data 242 is transmitted, the terminal may not transmit a NACK message 243.

When the base station does not receive an ACK message from the terminal, the base station may retransmit the first data 252. Also, the base station may retransmit the control information 251 associated with the first data 252. The retransmitted control information 251 may include an activation message with respect to the radio resource, and modulation and coding scheme information or error control scheme information associated with the first data 252.

When the terminal receives the retransmitted control information 251 and transmits an ACK message 253 to the base station using an uplink channel 220, the base station may no longer transmit additional control information. The base station may transmit the second data 262 to the terminal but may not transmit control information 261 associated with the second data 262. The terminal may receive the second data 262 using the control information 251 with respect to the second data 262.

When the terminal does not receive, from the base station, a deactivation message with respect to a radio resource, the base station may retransmit the deactivation message to the terminal, which is similar to an embodiment of checking on ACK message and retransmitting an activation message with respect to the radio resource.

Figure 3:
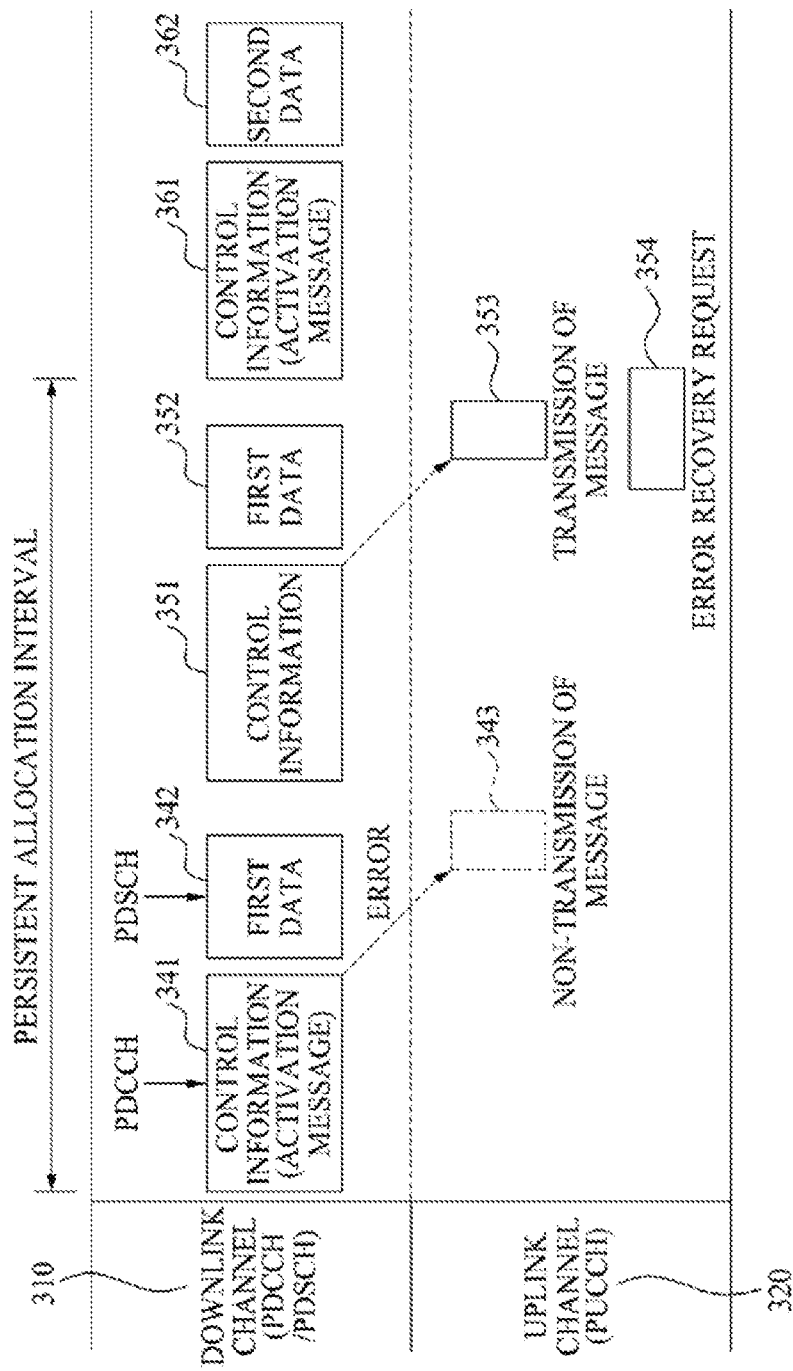
FIG. 3 is a diagram illustrating an operation of a terminal recovering from a transmission error according to an embodiment of the present invention.

FIG. 3 is a diagram illustrating an operation of a terminal recovering from a transmission error according to an embodiment of the present invention. A base station may transmit first data 342 and 352, and second data 362 using a downlink channel 310. Also, the base station may transmit control information 341, 351, and 361 using the downlink channel 310.

Here, it is assumed that the base station transmits the control information 341 associated with the first data 342 but a transmission error occurs.

When the transmission error occurs, the terminal may not receive an ACK message and may not transmit a NACK message 343. When the base station does not receive the ACK message from the terminal, the base station may retransmit the first data 352. The retransmitted control information 351 may include modulation and coding scheme information or error control scheme information associated with the first data 352.

The terminal may receive the first data 352 using the retransmitted control information 351. An activation message with respect to a radio resource may not be received yet at the terminal. The terminal may retransmit an error recovery request 354 using an uplink channel 320.

The base station may retransmit an activation message 361, in response to the error recovery request 354.

When the terminal does not receive, from the base station, a deactivation message with respect to a radio message, the base station may retransmit the deactivation message to the terminal, which is similar to an embodiment of retransmitting an activation message with respect to the radio resource.

FIG. 4 is a block diagram illustrating a structure of a base station 400 according to an embodiment of the present invention. The base station 400 may include a radio resource allocation unit 410, a control information generation unit 420, a transmitter 430, and a receiver 440.

The radio resource allocation unit 410 may allocate a radio resource to a terminal 450.

The control information generation unit 420 may generate control information by referring to the allocated radio resource. The control information may include information associated with the radio resource.

The transmitter 430 may transmit the control information to the terminal 450. According to an embodiment of the present invention, the transmitter 430 may transmit first data to the terminal 450 using the radio resource. The terminal 450 may receive information associated with the radio resource, included in the control information, and receive the first data using information associated with the radio resource.

According to an embodiment of the present invention, control information may include an activation message or a deactivation message with respect to a radio resource. The activation message with respect to the radio resource indicates that a previously unused radio resource is allocated to a particular terminal and is used to transmit first data. The deactivation message with respect to the radio resource indicates that a radio resource used to transmit the first data is released. In a 3GPP LTE system, the activation message and the deactivation message may be indicated as a field of a PDCCH, for example, one bit, or may be indicated as a terminal identifier for a voice service, for example, a semi-persistent scheduling C-RNTI, and the like.

Accordingly, the terminal 450 may receive the activation message with respect to the radio resource, and transmit the first data using the radio resource associated with the activation message. The terminal 450 may receive the deactivation message with respect to the radio resource and may suspend a transmission of the first data using the radio resource.

When the terminal 450 does not receive the activation message with respect to the radio resource, the terminal 450 may not receive the first data. Also, when the terminal 450 does not receive the deactivation message with respect to the radio resource, the radio resource may not be retrieved. Accordingly, the base station 400 may need to verify whether the terminal 450 receives the activation message or the deactivation message with respect to the radio resource. The terminal 450 may receive the control information, and may transmit, to the base station 400, an ACK message with respect to the received control information.

The receiver 440 may receive the ACK message with respect to the control information. When the receiver 440 does not receive the ACK message with respect to the control information, the base station 400 may not verify whether the terminal 450 does not receive the control information. In this case, the transmitter 430 may retransmit the control information to the terminal 450.

When the present invention is applied to the 3GPP LTE system, the ACK message may be transmitted using a Physical Uplink Control Channel (PUCCH). A content of the ACK message may include a Hybrid ARQ Positive Acknowledgement (HARQ ACK). A content of a NACK message may include a HARQ NACK.

According to an embodiment of the present invention, the control information may include modulation and coding scheme information associated with the first data or error control scheme information associated with the first data.

The transmitter 430 may transmit, to the terminal 450, the modulation and coding scheme information or the error control scheme information associated with the first terminal. The terminal 450 may receive the first data based on the modulation and coding scheme information or the error control scheme information.

According to an embodiment of the present invention, the transmitter 430 may transmit, to the terminal 450, second data using modulation and coding scheme information associated with the first data or error control scheme information associated with the first data. Specifically, control information transmitted from the transmitter 430 may be applicable to a plurality of data as well as particular data.

Also, the transmitter 430 may transmit the first data or the second data using the radio resource associated with the activation message.

FIG. 5 is a block diagram illustrating a structure of a terminal 500 according to an embodiment of the present invention. The terminal 500 may include a receiver 510 and a transmitter 520.

The receiver 510 may receive, from a base station 530, control information associated with data.

When the receiver 510 successfully receives the control information, the transmitter 520 may transmit, to the base station 530, an ACK message with respect to the control information. According to an embodiment of the present invention, the control information may include information regarding a radio resource associated with first data. The receiver 510 may receive the first data by referring to information associated with the radio resource.

According to an embodiment of the present invention, the control information may include modulation and coding scheme information associated with the first data or error control scheme information associated with the first data.

According to an embodiment of the present invention, the control information may include an activation message or a deactivation message with respect to the radio resource. The activation message with respect to the radio resource indicates that a previously unused radio resource is allocated to a particular terminal and is used to transmit the first data. The deactivation message with respect to the radio resource indicates that the radio resource used to transmit the first data is released. The receiver 510 may receive the first data using the activated radio resource.

FIG. 6 is a block diagram illustrating a structure of a base station 600 according to another embodiment of the present invention. The terminal 600 may include a transmitter 610 and a receiver 620.

The transmitter 610 may transmit, to a terminal 630, control information associated with first data. According to an embodiment of the present invention, the control information may include information associated with a radio resource that is allocated for the first data. Specifically, the control information may include information associated with a time domain or a frequency domain where the first data is transmitted.

According to an embodiment of the present invention, the control information may include an activation message with respect to the radio resource. The activation message with respect to the radio resource indicates that a previously unused radio resource is allocated to a particular terminal and is used to transmit the first data. The terminal 630 may receive the activation message and receive the first data using the activated radio resource.

Also, the deactivation message with respect to the radio resource indicates that the radio resource used to transmit the first data is released. The terminal 630 may receive the deactivation message and suspend the data transmission using the radio resource.

The control information may include at least one of modulation and coding scheme information associated with the first data and error control scheme information associated with the first data. The terminal 630 may receive the first data using the modulation and coding scheme information or the error control scheme information.

The control information is required for the terminal 630 to receive the first data. Accordingly, the base station 600 may verify whether the terminal 630 receives the control information. According to an embodiment of the preset invention, when the terminal 630 receives the control information, the terminal 630 may transmit, to the base station 600, an ACK message with respect to the control information. The receiver 620 may receive the ACK message with respect to the control information.

When the receiver 620 does not receive the ACK message with respect to the control information, it is uncertain whether the terminal 630 receives the control information. Accordingly, the transmitter 610 may retransmit the control information to the terminal 630.

According to an embodiment of the present invention, the control information may be applicable to second data as well as the first data. In this case, the transmitter 610 may also transmit the second data using the control information.

Although a few exemplary embodiments of the present invention have been shown and described, the present invention is not limited to the described exemplary embodiments. Instead, it would be appreciated by those skilled in the art that changes may be made to these exemplary embodiments without departing from the principles and spirit of the invention, the scope of which is defined by the claims and their equivalents.

We claim:

1. A communication apparatus, comprising:
a processor; and
a memory coupled to the processor,
wherein the processor, when executing program instructions stored in the memory, is configured to:
cause the communication apparatus to transmit a first message on a first Physical Downlink Control Channel (PDCCH) in a first subframe, wherein the first message indicates an activation of a semi-persistent scheduling and the first message comprises first information;
cause the communication apparatus to transmit first data on a first Physical Downlink Shared Channel (PDSCH) in the first subframe based on the first information;
cause the communication apparatus to transmit second data on a second PDSCH in a second subframe based on the first information; and
cause the communication apparatus to transmit a second message on a second PDCCH in a third subframe, the second message indicating a release of the semi-persistent scheduling,
wherein the processor is further configured to cause the communication apparatus to retransmit the second message if the processor fails to receive an acknowledgement (ACK) from a mobile terminal acknowledging receipt of the second message.

2. The communication apparatus of claim 1, wherein the first message is generated using a Semi-Persistent Scheduling Cell-Radio Network Temporary Identifier (SPS C-RNTI).

3. The communication apparatus of claim 1, wherein the second message is generated using the SPS C-RNTI.

4. The communication apparatus of claim 1, wherein the processor is further configured to:
receive an acknowledgement (ACK) after transmitting the first data.

5. The communication apparatus of claim 1, wherein the first information indicates modulation and coding scheme of the first data and the second data.

6. The communication apparatus of claim 1, wherein the second subframe does not include modulation and coding scheme of the second data.

7. A communication apparatus for wireless communication, comprising:
a processor; and
a memory coupled to the processor,
wherein the processor, when executing program instructions stored in the memory, is configured to:
cause the communication apparatus to receive a first message on a first Physical Downlink Control Channel (PDCCH) in a first subframe, wherein the first message indicates an activation of a semi-persistent scheduling and the first message comprises first information;
cause the communication apparatus to receive first data on a first Physical Downlink Shared Channel (PDSCH) in the first subframe based on the first information;
cause the communication apparatus to receive second data on a second PDSCH in a second subframe based on the first information;
cause the communication apparatus to receive a second message on a second PDCCH in a third subframe, the second message indicating a release of the semi-persistent scheduling; and cause the communication apparatus to transmit an acknowledgement (ACK) acknowledging receipt of the second message.

8. The communication apparatus of claim 7, wherein the first message is received using a Semi-Persistent Scheduling Cell-Radio Network Temporary Identifier (SPS C-RNTI).

9. The communication apparatus of claim 7, wherein the second message is received using the SPS C-RNTI.

10. The communication apparatus of claim 7, wherein the processor is further configured to cause the communication apparatus to transmit an acknowledgement (ACK) after receiving the first data.

11. The communication apparatus of claim 7, wherein the first information indicates modulation and coding scheme of the first data and the second data.

12. The communication apparatus of claim 7, wherein the second subframe does not include modulation and coding scheme of the second data.

13. A device for a mobile terminal, the device comprising:
a processor; and
a memory coupled to the processor,
wherein the processor, when executing program instructions stored in the memory, is configured to:
cause the mobile terminal to receive a first message on a first Physical Downlink Control Channel (PDCCH) in a first subframe, wherein the first message indicates an activation of a semi-persistent scheduling and the first message comprises first information;
cause the mobile terminal to receive first data on a first Physical Downlink Shared Channel (PDSCH) in the first subframe based on the first information;
cause the mobile terminal to receive second data on a second PDSCH in a second subframe based on the first information;
cause the mobile terminal to receive a second message on a second PDCCH in a third subframe, the second message indicating a release of the semi-persistent scheduling; and
cause the mobile terminal to transmit an acknowledgement (ACK) acknowledging receipt of the second message.

14. The device of claim 13, wherein the first message is received using a Semi-Persistent Scheduling Cell-Radio Network Temporary Identifier (SPS C-RNTI).

15. The device of claim 13, wherein the second message is received using the SPS C-RNTI.

16. The device of claim 13, wherein the processor is further configured to cause the mobile terminal to transmit an acknowledgement (ACK) after receiving the first data.

17. The device of claim 13, wherein the first information indicates modulation and coding scheme of the first data and the second data.

18. The device of claim 13, wherein the second subframe does not include modulation and coding scheme of the second data.

19. A communication method, comprising:
transmitting a first message to a mobile terminal on a first Physical Downlink Control Channel (PDCCH) in a first subframe, wherein the first message indicates an activation of a semi-persistent scheduling and the first message comprises first information;
transmitting first data to the mobile terminal on a first Physical Downlink Shared Channel (PDSCH) in the first subframe based on the first information;
transmitting second data to the mobile terminal on a second PDSCH in a second subframe based on the first information;
transmitting a second message to the mobile terminal on a second PDCCH in a third subframe, the second message indicating a release of the semi-persistent scheduling; and
retransmitting the second message to the mobile terminal if an acknowledgement (ACK) is not received from the mobile terminal, the ACK acknowledging receipt of the second message.

20. The method of claim 19, further comprising:
generating the first message using a Semi-Persistent Scheduling Cell-Radio Network Temporary Identifier (SPS C-RNTI).

21. The method of claim 19, further comprising:
generating the second message using the SPS C-RNTI.

22. The method of claim 19, further comprising:
receiving an acknowledgement (ACK) for the first data after transmitting the first data.

23. The method of claim 19, wherein the first information indicates modulation and coding scheme of the first data and the second data.

24. The method of claim 19, wherein the second subframe does not include modulation and coding scheme of the second data.

25. A communication method, comprising:
receiving, from a base station, a first message on a first Physical Downlink Control Channel (PDCCH) in a first subframe, wherein the first message indicates an activation of a semi-persistent scheduling and the first message comprises first information;
receiving, from the base station, first data on a first Physical Downlink Shared Channel (PDSCH) in the first subframe based on the first information;
receiving, from the base station, second data on a second PDSCH in a second subframe based on the first information;
receiving, from the base station, a second message on a second PDCCH in a third subframe, the second message indicating a release of the semi-persistent scheduling; and
transmitting, from the base station, an acknowledgement (ACK) acknowledging receipt of the second message.

26. The method of claim 25, wherein the first message is received using a Semi-Persistent Scheduling Cell-Radio Network Temporary Identifier (SPS C-RNTI).

27. The method of claim 25, wherein the second message is detected using the SPS C-RNTI.

28. The method of claim 25, further comprising:
transmitting, to the base station, an acknowledgement (ACK) for the first data after receiving the first data.

29. The method of claim 25, wherein the first information indicates modulation and coding scheme of the first data and the second data.

30. The method of claim 25, wherein the second subframe does not include modulation and coding scheme of the second data.

* * * * *